United States Patent
Lupper et al.

(10) Patent No.: US 7,286,530 B2
(45) Date of Patent: Oct. 23, 2007

(54) METHOD FOR CONNECTION OF DATA TERMINAL DEVICES TO A DATA NETWORK

(75) Inventors: Alfred Lupper, Aystetten (DE); Hans-Jochen Morper, Erdweg (DE); Maximilian Riegel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 782 days.

(21) Appl. No.: 10/381,809

(22) PCT Filed: Sep. 21, 2001

(86) PCT No.: PCT/DE01/03656

§ 371 (c)(1),
(2), (4) Date: Jun. 2, 2003

(87) PCT Pub. No.: WO02/28013

PCT Pub. Date: Apr. 4, 2002

(65) Prior Publication Data

US 2004/0017800 A1    Jan. 29, 2004

(30) Foreign Application Priority Data

Sep. 29, 2000    (DE) ................. 100 48 487

(51) Int. Cl.
*H04L 12/28* (2006.01)
(52) U.S. Cl. .............. 370/389; 370/352; 370/392; 370/401
(58) Field of Classification Search .......... 370/310, 370/395.1, 397, 395.5, 401, 352, 466, 469, 370/389, 392, 475
See application file for complete search history.

(56) References Cited

U.S. PATENT DOCUMENTS

| 6,151,495 | A | * | 11/2000 | Rune ................ 455/426.1 |
| 2001/0030977 | A1 | * | 10/2001 | May ................ 370/475 |
| 2003/0145119 | A1 | * | 7/2003 | Bender et al. .......... 709/249 |
| 2004/0132473 | A1 | * | 7/2004 | Mir et al. ............ 455/517 |

FOREIGN PATENT DOCUMENTS

| EP | 0 999 672 A2 | 5/2000 |
| WO | WO99/52237 | 10/1999 |
| WO | WO99/66400 | 12/1999 |
| WO | WO00/44133 | 7/2000 |

* cited by examiner

*Primary Examiner*—Ricky Q. Ngo
*Assistant Examiner*—Pao Sinkantarakorn
(74) *Attorney, Agent, or Firm*—Staas & Halsey LLP

(57) ABSTRACT

A method for connection of at least one station to a data network. In a first data network based on a first technology, the data network comprises one or more network devices and/or interfaces to establish communication with at least one station of the first technology, and with base functions for an autonomous operation of the first network. According to an aspect of the invention, a station with a non-network technology may be connected to a data network via a method for the connection of the station using a logical point-to-point connection. The data network comprises network devices for the transmission of data in a communications connection, and an access device with an interface for the establishment of a communication connection with at least one station. The communications connection between the access device and at least one network device occurring in a connectionless manner over a shared medium, whereby a point-to-point data connection is simultaneously established and maintained between the access device and the station. Further, another aspect of the invention relates to a corresponding data network and a network device, which permit the method to be carried out.

20 Claims, 5 Drawing Sheets

METHOD FOR CONNECTION OF DATA TERMINAL DEVICES TO A DATA NETWORK

CROSS REFERENCE TO RELATED APPLICATIONS

This application is based on and hereby claims priority to PCT Application No. PCT/DE01/03656 filed on 21 Sep. 2001 and German Patent Application No. 100 48 487.5 filed on 29 Sep. 2000, the contents of which are hereby incorporated by reference.

BACKGROUND OF THE INVENTION

An aspect of the invention relates to a method for connecting at least one station to a data network, a corresponding data network, and a corresponding access device.

In wired communications systems, communication takes place between interconnected subscriber stations with switching centers (exchanges), usually being interposed between these subscriber stations. In the case of a data access, particularly in such wired communications systems, connections between a subscriber station and an access network are usually controlled via a point-to-point protocol (PPP). When a connection is set up, authentication of the subscriber or the subscriber station setting up the connection takes place. This authentication may be used among other things as a basis for centralized accounting of accruing charges. The RADIUS protocol (RADIUS: Remote Authentication Dial In User Service) is known as suitable for purposes of authentication.

If such communications systems offer the subscriber stations, e.g. a computer or host, a network access for data transfer, e.g. for Internet services, at the time a subscriber station is installed, a configuration takes place in which all settings necessary for the data access, particularly IP addresses (IP: Internet Protocol) are stored in the subscriber station. These permit the subscriber station, or the subscriber, to contact supporting services that are essential for execution of the desired data service, e.g. Internet access, as well as network components on which these run. For example, in addition to the IP address of an HTTP server, which enables an Internet page to be called up conveniently "by a mouse click", these addresses include the address of a DNS (Domain Name Server), which ascertains the IP address associated with a unit connected to the network (service server; subscriber station), as well as the address of an SMTP server (Simple Mail Transfer Protocol), which is necessary for transmitting electronic messages, known as e-mail.

In addition to the aforementioned communications systems, there are data networks that are usually set up locally and are designed for general-purpose connection of data terminals. In the following, these data networks are referred to as hosts, simply to differentiate them from the aforementioned subscriber stations without restrictions. Two host computers can be connected to each other, directly or via hubs and bridges, and to network devices such as an access server. Data packets are transported between a host and another network device mostly via IP (Internet Protocol).

When a host connects to a network, a local area data network (LAN) for example, the host is assigned an IP address by a connection or access server, for example, via the Dynamic Host Configuration Protocol (DHCP). The IP address enabling the host to be uniquely identified and addressed in the network. At the same time, the host is also informed of addresses of auxiliary services that are important to it and/or of network components on which these services are executed in this network.

A host is normally connected to a local area network by wire, although in more recent networks, the last segment of a wire-based access can be implemented wirelessly via radio. A local area network that supports the wireless connection of hosts is generally referred to as a W-LAN (Wireless Local Area Network).

During the installation, for an IP access, a subscriber station of a telecommunication system must be informed of the IP addresses required, in advance, for a connection setup. This is prior to a first connection or connection setup with a corresponding network interface via a software installation. Conversely, with a local area data network, all the necessary IP addresses can be directly assigned, automatically, for each new connection of a host to a data network. A subscriber station and a host are therefore not devices that are compatible with the other network technology.

A further exemplary incompatibility reveals itself, for example, in the type of connection setup. On the one hand, a point-to-point connection protocol (PPP) is used between subscriber stations and the network-side data terminal devices found in telecommunications systems, known as RAS (Remote Access Servers), the point-to-point protocol being used for connection control between the actual network-specific transport protocol layers and the IP. On the other hand, this additional connection control is not required in local networks, known, among other things, as LANs (Local Area Networks), with the result that data packets, called IP packets, can be transferred directly on the underlying transport layer. The transport layer is advantageously provided by Ethernet.

Patent application EP 0 999 672 A2 discloses a system in which mobile terminals gain access to a data/IP network, for example the global Internet, via a radio access network (RAN) and a packet data serving node (PDSN) connected to the radio access network. A PPP/HDLC (Point-To-Point Protocol/High Level Data Link Control) protocol is used both in the mobile terminal and in the packet data serving node for this purpose.

WO 99/66400 A2 discloses an AAA server (Authentication, Authorization and Accounting Server) which enables different users to access a computer network by providing a plurality of transport protocol modules. The authentication, authorization and accounting is performed for all users on the basis of a database attached to the AAA server, in which the corresponding user data is stored.

U.S. Pat. No. 5,796,727 A describes a method that enables mobile computers equipped with modems to access different data communications services and participate in LANs (Local Area Networks) via a cellular telephone system.

The currently available data network technologies enable a subscriber to log in using his/her notebook computer with a radio data network card, for example, at an airport, into another data network accessible via a radio interface. This is possible because no authorization check is carried out in data networks that are designed to be open. However, the network operator can only prevent the external subscriber from accessing certain files or programs in the data network at the expense of considerable programming overhead. The programming must also be performed in different devices of the data network and in the different hosts to be protected against external accesses. Protection is only possible to a limited extent, particularly, in circumstances where network-internal IP addresses are known to the host or the subscriber.

SUMMARY OF THE INVENTION

One aspect of the invention is to make the different systems, particularly a telecommunications system and a local area data network, compatible with one another in such a way that accesses by a station in a first system to stations of a second system, based on a different technology, are possible with minimal structural and/or programming overhead.

Normally, in the method for connecting at least one station, in particular a data terminal device, to a data network having at least one network device for forwarding data of a communications connection and basic functions for autonomous operation of the data network, via an access device with an interface for setting up a communications connection to the station, the communications connection between the access device, which usefully represents a network device and at least one of the further network devices, is set up in a connectionless manner via a shared medium. According to one aspect of the invention, in the method for the communications connection, a logical point-to-point connection is set up and maintained between the access device and the station. This enables the connection of stations based on a different technology for point-to-point connections to a conventional data network, with modifications needed to be carried out in only one station.

It is particularly useful that the access device, at least temporarily, takes over service configuration client functions of a data terminal device and that the access device, at least temporarily, takes over service configuration server functions (RAS) of the data network, since such functions are provided by network-typical stations or corresponding network devices and are requested for setting up a communications connection.

The fact that the access device requests the assignment of a temporary identification address (IP address) of the station by service configuration client functions (DHCP) of a station, particularly a data terminal device that can be connected in a connectionless manner, from the data network and/or assigns the address to the station with the aid of service configuration server functions of the data network advantageously enables an address assignment that is usual and necessary for data networks.

The fact that the access device exchanges the data to be exchanged via the communications connection with the station in a transmission frame (PPP) that is usual for a point-to-point connection and converts this data into a transmission frame (Ethernet) corresponding to the connectionless network-internal connection, or vice versa, enables simple conversion of different transmission formats in a single station. Consequently, modifications in further stations, particularly the stations, are not required. This applies in particular if the access device initiates or performs the conversion of a PPP transmission frame into an Ethernet transmission frame and/or vice versa.

The fact that a PPP protocol (Point-to-Point Protocol) of a cellular telecommunications network is used between the station and the access device enables stations based on dissimilar point-to-point technology to be connected to a conventional data network.

The fact that the access device requests an IP address, particularly via a DHCP client function, from the data network and forwards the IP address via a PPP protocol to the station allows the latter to appear like a normal data network terminal device to the data network.

This method can be used for a plurality of standards. Different air interface protocols or standards can be used between the access device and the station, particularly the Bluetooth standard, the DECT standard, the HomeRF standard, the IEEE 802.11 standard, the IEEE 802.11b standard, the IEEE 802.11a standard, the HiperLAN standard, the HiperLAN2 standard, the GSM standard or the UMTS standard.

The fact that following the successful assignment of an IP address to the station, a DHCP client function of the access device is relinquished by the access device in favor of the DHCP client function of the station and the further service configuration is handled by the station via DHCP client functions of the station and by the DHCP server function of the data network saves resources of the access device and particularly also of the data network.

An aspect of the invention proposes a data network, particularly a local area data network conforming to e.g. the Ethernet standard, and comprises an access device for the data network, the access device being able to implement such a method.

The access device is advantageously implemented on the station side as a radio base station and on the network side as a network device, particularly a bridge or hub. The station can be linked to the access device or the data network via a wired or wireless connection.

By such structure, stations of the one system can thus communicate with stations of the other system with only minimal structural and/or programming overhead. The different technologies can thus be combined in such a way that, in each case, the advantageous characteristics of devices based on other technologies can be utilized. In particular, for example, authentication and authorization functions from a cellular radio telecommunications network can be made available to a data network so that it will be possible, for example, to authenticate and authorize a subscriber not belonging to the data network.

In particular, necessary adaptations in system or network stations can be made so that no modifications need to made at the end stations, that is, at the level of the subscriber stations and hosts, which represent the mass-produced commodities of a communications or data network.

In the ideal case this results in a generic overall architecture which offers the best range of advantages of disparate technologies. The method is therefore not just a simple further development of an individual technology, but a unique overall concept that is painlessly extendible. The overall architecture comprises these advantages:

it offers simple, easy access and the autoconfigurability of a local area data network (LAN), it combines and/or uses PP protocol and DHC protocol access philosophies, it supports the most suitable mobility functionality for mobile data access, it offers data access for services with high bandwidth requirements (best effort services), it guarantees a high level of security, it offers connection to cellular networks, particularly radio telecommunications systems, it can be implemented very cost-effectively, it supports all possible host platforms (PC/laptop/Palm®Top/Windows®/Linux®/OS2®/MAC OS®, . . . ) with minimal, platform-neutral programming effort, it provides standardized transport and access technologies.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
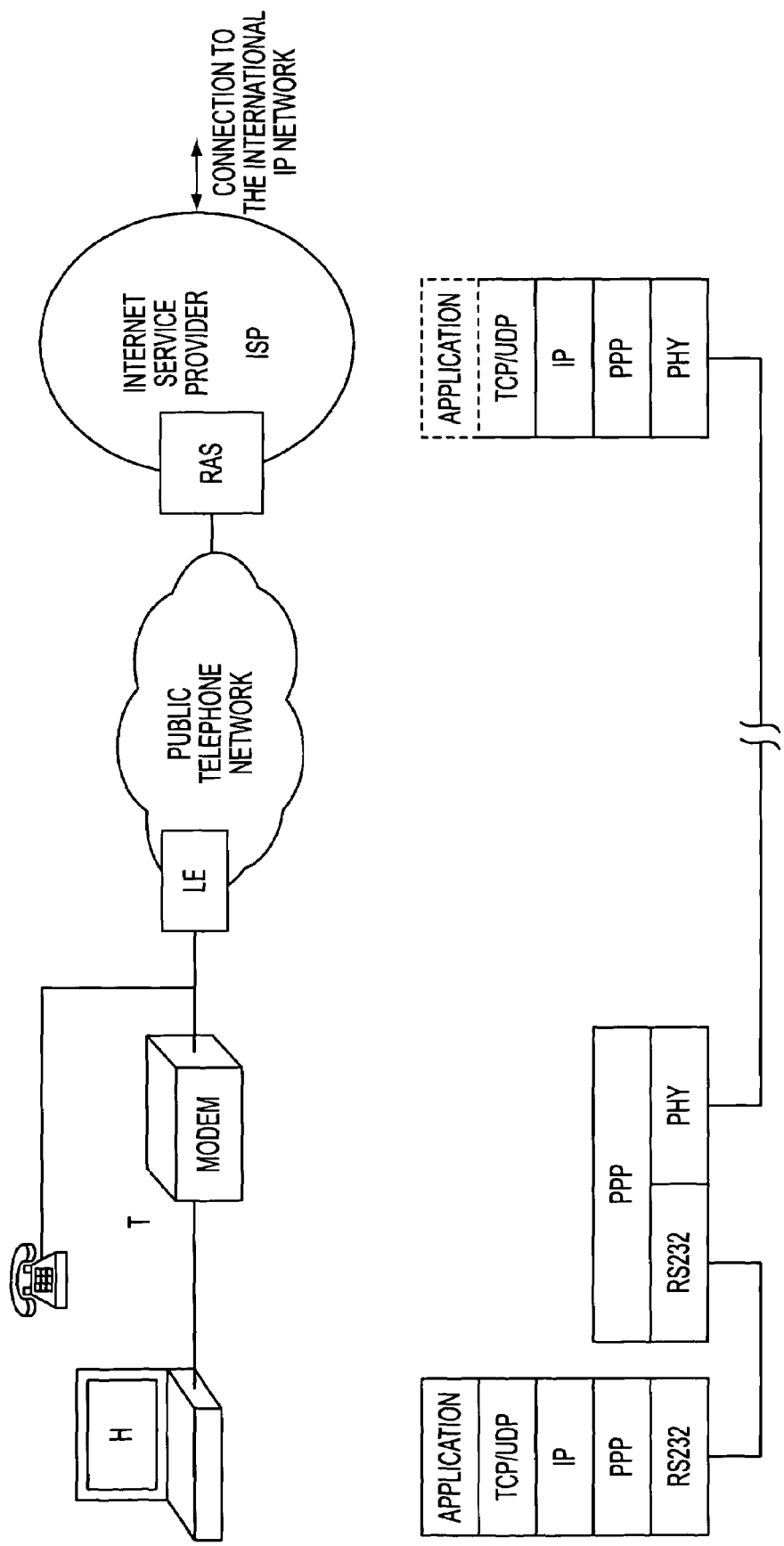
FIG. 1 shows a schematic structure for a typical connection of a telecommunications network subscriber to the Internet, and moreover via a dial-in connection via a modem, with a tabular overview of protocol functions of individual devices in the lower half of the figure.

Reference will now be made in detail to the preferred embodiments of the present invention, examples of which are illustrated in the accompanying drawings, wherein like reference numerals refer to like elements throughout.

As shown in FIG. 1, a telecommunications system or network preferably comprises wired subscriber devices, for example, telephones T and computers or hosts H connected via a modem device. The telecommunications system can, for example, be an integrated services digital message network ISDN (Integrated Services Digital Network), a conventional public switched telephone network PSTN or a digital xDSL system (DSL: Digital Subscriber Line). The individual subscriber devices T and H are connected to the network devices via local exchanges LEs.

Particularly for connecting hosts to a data network via a transport network (ISDN), the telecommunications system PSTN/ISDN has a server for remote data access, referred to in the following as a remote access server (RAS). The remote access server, RAS, is required for current systems for setting up connections to the subscriber data terminal devices, particularly hosts H, and operates with a point-to-point protocol PPP, which usually meets the requirements for the Internet protocol IP. Authentication of a subscriber station is usually carried out via the service referred to as RADIUS (Remote Authentication Dial In User Service). In addition, the remote access server RAS usually comprises modem banks for the network-side and subscriber-side data transport and routers for connecting to the IP-based Internet, known as the IP backbone.

Figure 2:
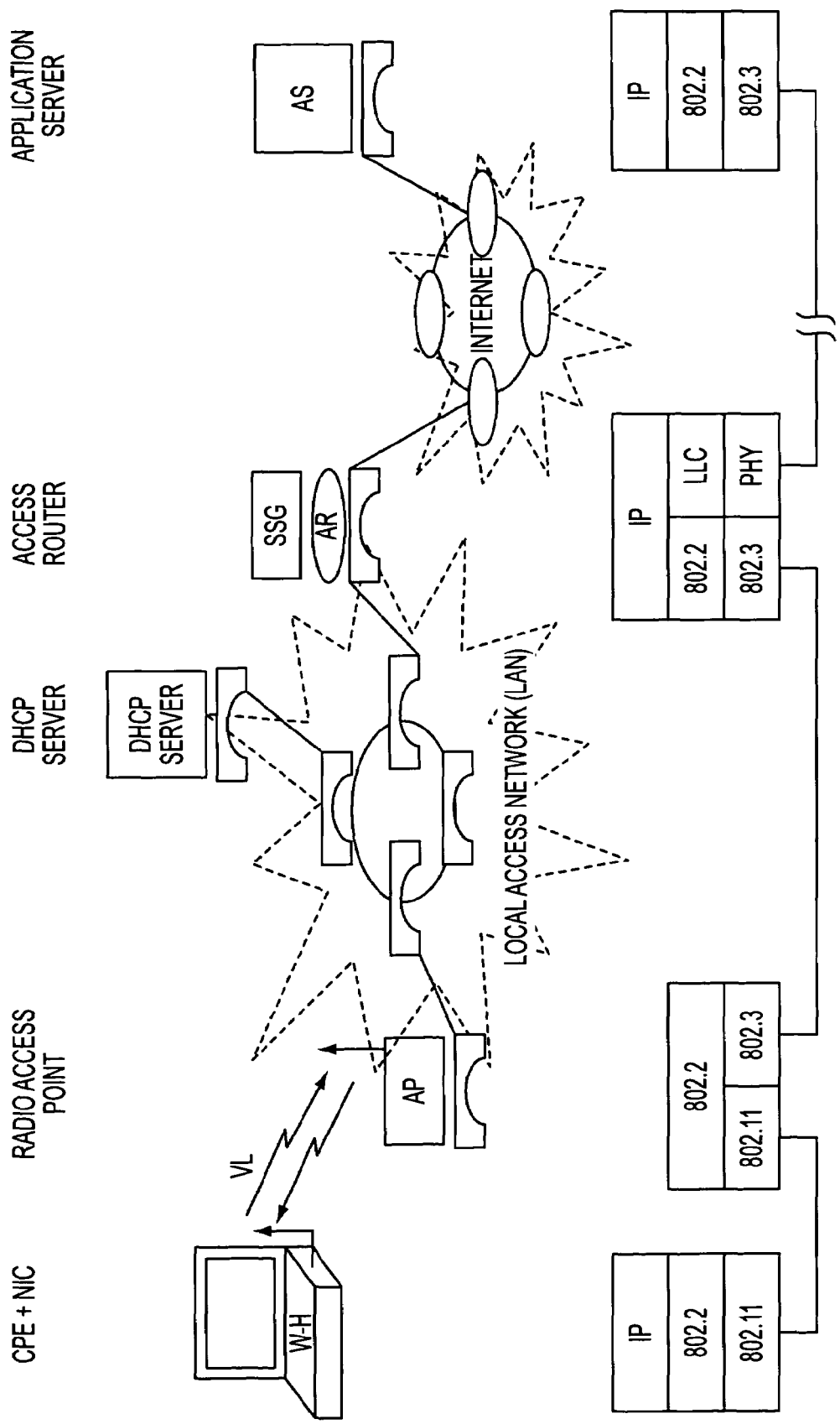
FIG. 2 shows a schematic structure of a local area network with a tabular overview of protocol functions of individual devices.

As shown in FIG. 2, a local area data network LAN, e.g. a wireless local radio network WLAN, comprises stations which are referred to in the following as hosts H. A typical example of such a data network LAN is a company's in-house Ethernet. In this, the individual stations and hosts H are connected to one another directly or via bridges and hubs. A hub can be regarded here essentially as a distribution device to which multiple data terminal stations H can be connected simultaneously and will then receive all the data routed to them. A bridge is basically similar to a hub, but additionally offers a way of segmenting and distributing the data passing through.

In addition to permanently wired connections in a data network LAN, in radio data networks WLAN (Wireless Local Area Network) there are also connections via radio interfaces VL. For radio connections of this type, the so-called Bluetooth radio access protocol (Bluetooth radio AP) or similar can be used. This is a protocol which supports a point-to-point connection between two currently communicating devices. It is therefore considerably simpler in structure than the protocols used for cellular radio systems.

Such systems mainly use an air interface based on the IEEE 802.11 standard application.

A data network (W-)LAN of this type can also contain one or more service servers, particularly comprising logical devices described below, e.g. a domain name server DNS. However, some of these devices can also be included in other or standalone devices, where they can be subdivided into and/or set up as client part and server part.

An HTTP server permits the subscriber to access Internet pages selected by the user "by a mouse click" without the need to know the specific IP addresses of the particular provider.

By a dynamic host configuration protocol DHCP and/or a so-called DHCP server, an address, particularly an IP address, is assigned when a host H connects to the data network (W-)LAN, enabling the newly added host H to be uniquely identified and addressed in the network. The address assignment is mostly variable so that the only limited address space available internationally for all hosts H is not exhausted. The DHCP server can advantageously assign IP addresses on a time-limited basis, with the result that a host H must request a new IP address after a specified time has expired.

The access server AS can further include an authentication and authorization server (AA server) which, as an accounting server (AAA server), can optionally also support centralized accounting of accruing charges.

Further server devices can be used for connecting to networks such as the Internet, examples being so-called POP3 servers and/or SMTP servers (SMTP: Simple Mail Transfer Protocol), which serve for exchanging electronic letters (emails).

In the exemplary embodiments described in more detail below, a simple modification and/or enhancement will be made in each case to preferably only one individual network device SSG in one of the systems, i.e. in the actual data network (W-)LAN and/or in the actual telecommunications network, e.g. GSM/UMTS, so that particularly technically structural changes to the subscriber stations and/or data terminal devices H of the respective networks can be avoided.

In the ideal case it is sufficient to introduce a device referred to below as a service selection gateway (SSG) in a data network (W-)LAN, with the known Simple Network Management Protocol (SNMP) being usable for controlling essential functions. However, some of the individual devices described below also include components/functions of a service selection gateway SSG.

Thus, a commercially available standard host W-H can continue to communicate with a central processing device CPE and a network interface card NIC via a radio interface VL with a commercially available bridge that supports radio connections. At the same time existing protocols can be used for a DHCP access, e.g. 802.11 or a HiperLAN radio access protocol. The bridge forms the interface between e.g. the protocols for data network radio interfaces (802.11) and data network cable interfaces (802.3) in the usual way.

Conventional radio stations can also be deployed in the system, where they support point-to-point connections with other devices, e.g. a data terminal device H with a radio interface, as an alternative radio technology. A typical standard protocol for this is the so-called Bluetooth radio access protocol.

A local radio access network (W-)LAN of this type can provide subscribers with wireless data access e.g. in order to use Internet services. In the case of an unauthenticated, non-charged subscriber access it is sufficient to provide a system as shown in FIG. 2.

In the case of a point-to-point connection used for the radio access, one or more servers AS (Access Server) are advantageously provided in the network, the servers terminating the logical point-to-point connection on the network side. Such access servers can be integrated e.g. in the service selection server SSG.

A subscriber terminal device W-H wirelessly connected to a local area network (W)-LAN can contact a radio access point AP (Access Point) via an air interface VL (IEEE 802.11), the access point AP advantageously being implemented in the network topology as a bridge (LAN bridge). The temporary access identity required for this data session, e.g. an IP address, is assigned dynamically by a DHCP server. In the subscriber terminal device W-H, the DHCP server also configures, among other things, the address, e.g. IP address, of an access router AR to the IP transport network. FIG. 2 also shows an example of the protocol layers that are typically used, based on the well-known IEEE 802.11 standard in the example.

In other words, a subscriber wirelessly accesses a radio access point in accordance with the method described above and is thereupon assigned a temporary identity, e.g. an IP address, by a DHCP server. Normally, subscribers use special Internet or network access software, known as browsers, for network access and select, either "by a mouse click" or manual entry via a keyboard, an Internet page which is referenced by a universal data source specification in text form (URL: Universal Resource Locator). The network access software is able to select or address a specific service or service selection server SSG, particularly an HTTP server, whose IP address was notified to the subscriber terminal device W-H by the DHCP server. The address of the service selection server SSG is advantageously synonymous with the IP address of the service selection server SSG. This HTTP server is able to interpret the desired data source reference (URL) and display the Internet page desired by the subscriber. Similarly, the service selection server SSG itself can generate Internet pages and display them on the subscriber terminal device.

Most local area networks that offer a connection possibility to a host are currently based on the familiar Ethernet technology. FIG. 2 shows the most important protocol characteristics in tabular form for the connection layer (based on the familiar IEEE 802.2 standard), as well as the physical transport layers for wired, terrestrial transport (IEEE 802.3) and wireless transport via an air interface (IEEE 802.11).

The most technologically outstanding feature of Ethernet technology is the use of the transmission medium (air or wire) as a shared medium. This means that—in contrast to circuit-switched connections—the entire transmission capacity (e.g. 10 megabits per second) is available to all users (hosts) connected to a transmission section, e.g. Yellow Cable. Thus, in the case of low overall subscriber activity, an individual subscriber can—for a certain time—take advantage of a much higher data transfer rate than when there is a high level of overall subscriber activity. In the case of circuit-switched connections, a static transfer rate (e.g. 64 kilobits per second, ISDN) is often available to a subscriber, independently of the activity of a user or host.

Shared (transmission) media are therefore much better suited for the transport of packet-switched data, particularly IP data, since they come closest to meeting the transmission bandwidth requirements (best effort) of an Internet service user. This outstanding technical feature led to a worldwide spread of Ethernet technology, with the result that today practically all local area data networks (LANs) are based on this method and the corresponding topology.

Radio-based data access for local area networks ((W) LAN) is, in the case of the familiar IEEE 802.11 standard, a logical extension in order to make the formerly wire-based transport technology also usable for the medium "air" (shared medium).

In contrast to the air interface IEEE 802.11, or 802.11b or 802.11a, specifically designed for wireless LAN access, further radio technologies suitable for data transport are widespread. Thus, the DECT air interface standard is widespread, mainly in the European area, and the international market launch of Bluetooth technology is imminent.

On the one hand, these radio technologies are not optimized for connection to local area data networks (LANs), often because they are used for other purposes (e.g. for voice). On the other hand, they offer a high usage potential because of their widespread availability.

Technologies of this type currently are frequently used for wireless data access to circuit-switched networks, e.g. as a wireless extension of the serial computer interface to the modem (DECT), or they are preferably used for data transfer over a point-to-point connection, e.g. for transmission of voice between a microphone and a mobile radio terminal device (Bluetooth).

This is why it is often necessary to use a PPP (Point-to-Point Protocol) protocol layer, which is sandwiched between the actual transport layer and the IP layer. This permits e.g. the setup and cleardown of circuit-switched connections. Further tasks of this protocol layer comprise the allocation of a connection-oriented IP address to the host, as well as the transport of authentication-relevant information.

Figure 3:
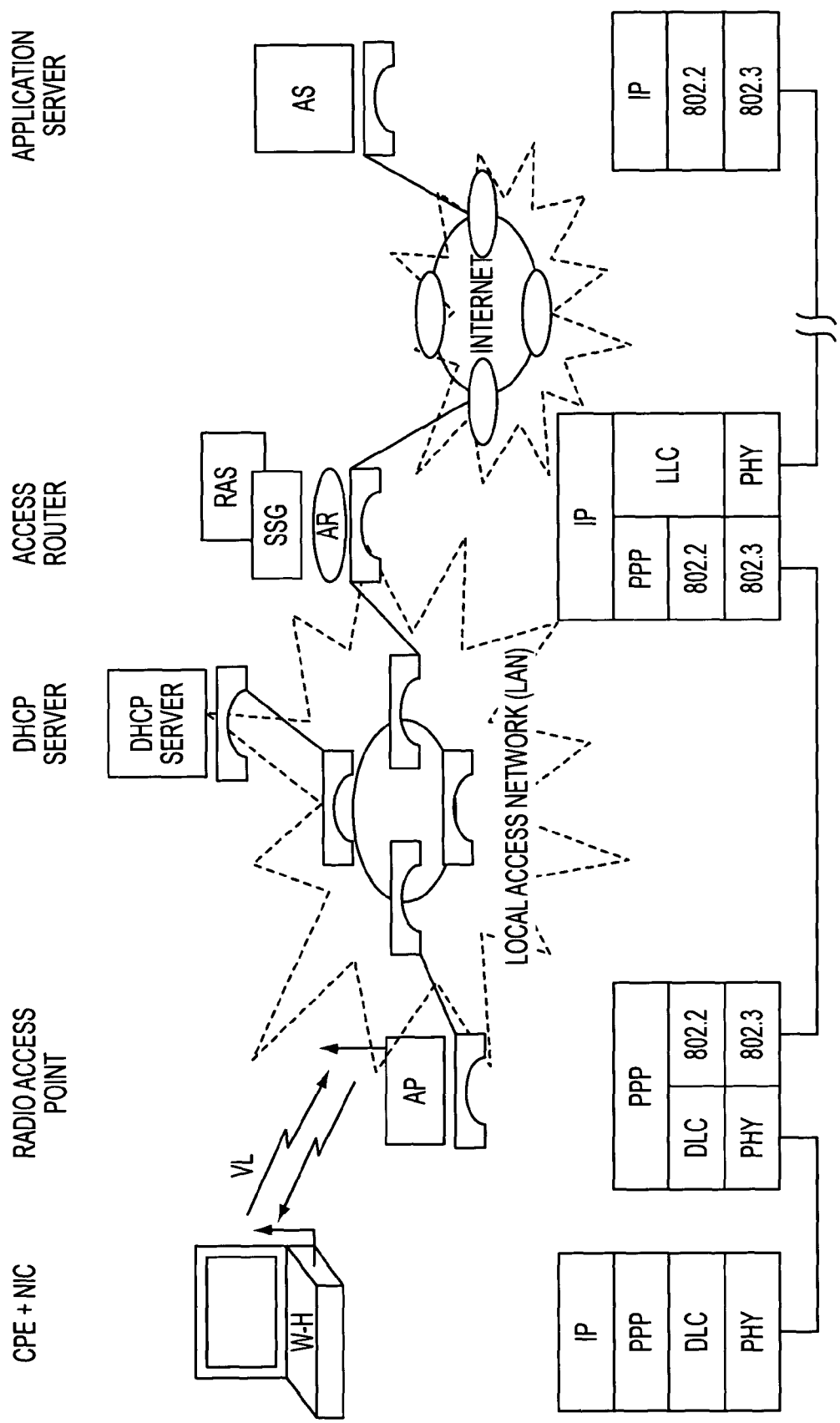
FIG. 3 shows a first exemplary embodiment of a PPP access to a local area network.

On the network side, the PPP protocol layer has to be terminated, since the international IP network (IP backbone) is based on IP routing and is not transparent for the transport of PPP frames. This termination is implemented e.g. in a remote access server (RAS) of an Internet service provider (ISP) (see FIG. 1). In the case of a W-LAN connection, such a termination can be effected as illustrated in FIG. 3, e.g. in a service selection server SSG. In this case FIG. 3 represents a first embodiment.

In contrast to generic LAN access, which, as described above, supports the autoconfiguration of computers (hosts) via the dynamic host configuration protocol DHCP, the PPP protocol cannot be used to transfer autoconfiguration parameters, such as IP addresses of important services. If necessary, these must be configured manually, e.g. during the installation of an Internet access via the telephone network. Consequently, many important services (e.g. electronic mail, Domain Name Server DNS) currently cannot be modified automatically for mobile subscribers moving between Internet domains without considerable proprietary changes being made to the subscriber terminal device (host).

In particular with the embodiment described below with reference to FIG. 4, two of the problems with connecting point-to-point (PPP) oriented air interfaces to a local area data network LAN are solved. With this embodiment it is no longer mandatory that the data network must possess an instance (RAS) that enables the PPP protocol layer to be handled, with the result that there are now no longer two classes of subscribers in such a network, i.e. those with a PPP connection and generic LAN subscribers, which had to be handled differently in administrative terms, and many important network services cannot beautoconfigured, which made their use, e.g. for mobile access to Internet services, more difficult or even impossible.

A notable feature also comprises in the method that point-to-point oriented air interfaces are made usable as wireless access to local area data networks (LAN) without special service servers, particularly remote access servers (RAS), being made necessary to provide support in this regard in the local area data network, and moreover while preserving the LAN-typical autoconfigurability of the computer devices (W-H, DHCP) connected via these interfaces.

Figure 4:
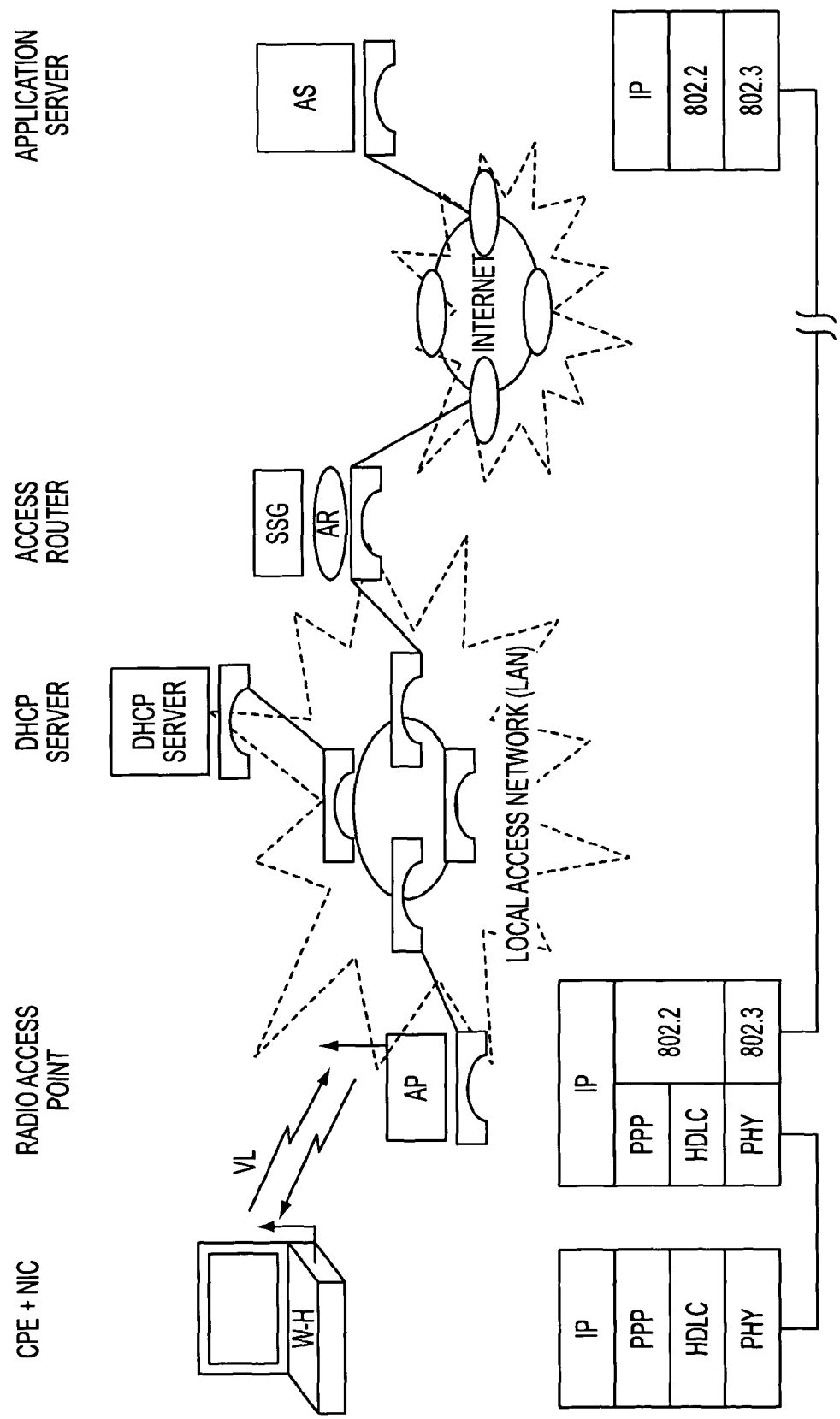
FIG. 4 shows an advantageous exemplary embodiment for integrating point-to-point-oriented subscriber accesses to a local area network.

FIG. 4 shows an advantageous embodiment of a network architecture in this regard. A host W-H is connected via an air interface VL to a radio access point AP of a local area access network LAN. At the same time the radio access point AP, which in respect of its connection to the local area network LAN can be implemented as a bridge, terminates the PPP protocol and in respect of the logical connection control via the air interface. In this case the HDLC (High-level Data Link Control) protocol usual for serial data transfer can be used.

In FIG. 4, the network-side connection of the radio access point AP is implemented on the basis of the Ethernet physical layer and the control layer (802.3, 802.2). On the subscriber side, the radio access point AP presents itself as an instance which, in addition to terminating the air interface, also handles the logical point-to-point connection control.

With this type of connection, which is based on a logical point-to-point connection, application software, e.g. an Internet browser, installed in the subscriber data terminal device, particularly the radio host W-H, is in many respects configured in such a way that it corresponds to a dial-in connection via modem: the IP addresses of important network services are preset, and only the own IP address assignable to the host for the duration of a connection can be assigned dynamically by the PPP protocol.

In the case where a host sets up a connection to a radio access point AP via an above-described air interface, the radio access point AP takes on the functionality of a DHCP client. Via this client, a host W-H, which is connected wirelessly to the radio access point AP via a point-to-point connection is assigned an IP address by a DHCP server connected to the local area data network (LAN). With regard to this function, the radio access point AP acts toward the local area data network (LAN) or toward a DHCP server connected to the LAN like a LAN host requesting an IP address via its DHCP client function. The DHCP server immediately sends the assignment of an IP address to the radio access point AP. The radio access point AP can now transmit the IP address to the host by the PPP protocol using mechanisms that are proper to the PPP protocol.

Once this has happened, the radio access point AP relinquishes the DHCP client function once again in favor of the host W-H. Further configurations of the host are now effected using the DHCP client function of the host W-H.

Figure 5:
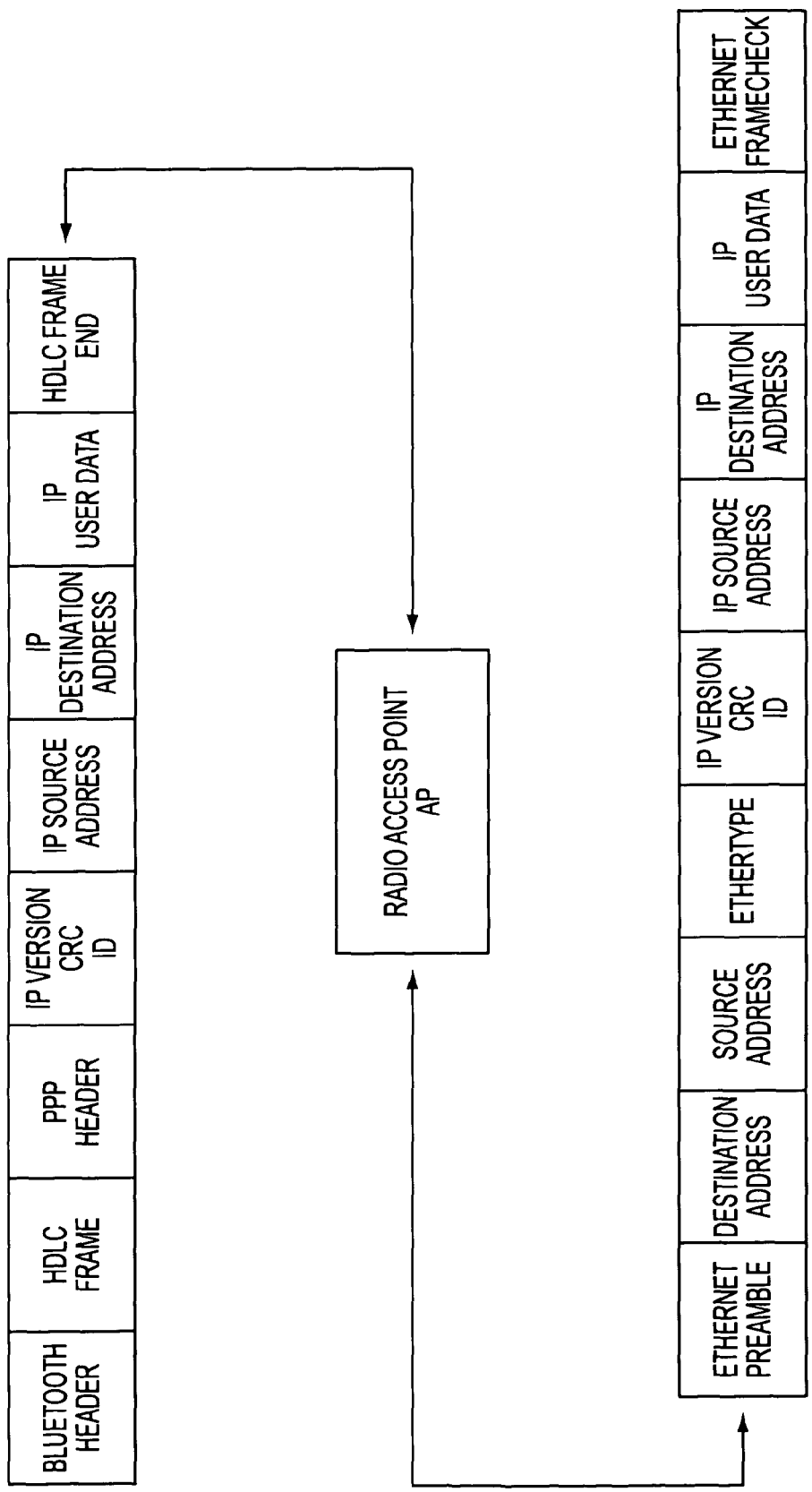
FIG. 5 shows an exemplary conversion of a data frame structure for connecting a point-to-point-oriented radio technology.

FIG. 5 shows how, in this process, the radio access point AP performs a conversion of the frame structure of the data transferred between host W-H and local area data network LAN.

Here, the actual IP user data (IP: Internet-Protocol) is embedded on the subscriber side in a PPP frame, which can, in turn, be embedded in an HDLC frame (serial data transport), which can, in turn, be embedded in the usual transfer frame of the air interface, e.g. Bluetooth. An IP packet usually comprises control information such as IP version number, checksum (CRC: Cyclic Redundancy Check), a sender and a receiver address, and the actual user data itself. On the network side, an IP packet is embedded in an Ethernet frame, which comprises a preamble, a checksum, a destination and a source address, and an Ethertype field.

Depending on the data direction, host to network or vice versa, the radio access point AP performs the necessary frame conversion in each case.

The invention has been described in detail with particular reference to preferred embodiments thereof and examples, but it will be understood that variations and modifications can be effected within the spirit and scope of the invention.

The invention claimed is:

1. A method for connecting at least one station to a data network, comprising:
   providing the data network with at least one network device that forwards data of a communications connection;
   providing an access device, the access device having an interface for setting up a communications connection to a station;
   establishing a communications connection between the access device and at least one of the network devices on a connectionless basis via a shared medium;
   setting up a logical point-to-point data connection for the communications connection between the access device and the station;
   sending a request to the data network to allocate a temporary identification address to the station, the request being sent via service configuration client functions characteristic of stations connected through a connectionless basis in the data network; and
   assigning the temporary identification address to the station with the aid of configuration server functions of the data network wherein
   following successful assignment of an Internet Protocol address to the station by a Dynamic Host Configuration Protocol client function of the access device, the Dynamic Host Configuration Protocol client function of the access device is relinquished in favor of a Dynamic Host Configuration Protocol client function of the station, and
   further service configuration is performed by the station via Dynamic Host Configuration Protocol client functions of the station and by the Dynamic Host Configuration Protocol server function of the data network.

2. The method according to claim 1, wherein the data network comprises basic functions for autonomous operation of the data network.

3. The method according to claim 1, wherein the access device sends a request to the data network to allocate a temporary identification address to the station, the request being sent via the service configuration client functions characteristic of stations connected through a connectionless basis in the data network, and the access device assigns the temporary identification address to the station with the aid of the configuration server functions of the data network.

4. The method according to claim 1, wherein
the access device exchanges data with the station via the communications connection in a transmission frame typical for a point-to-point connection, and
the access device converts the data into a transmission frame corresponding to the connectionless network-internal connection.

5. The method according to claim 1, wherein a Point-to-Point Protocol of a cellular telecommunications network is used to communicate between the station and the access device.

6. The method according to claim 1, wherein
the access device requests an Internet Protocol address from the data network using a Dynamic Host Configuration Protocol client function; and
the access device forwards the Internet Protocol address to the station using the Point-to-Point Protocol.

7. The method according to claim 1, wherein the access device initiates or performs conversion between a Point-to-Point Protocol transmission frame and an Ethernet transmission frame.

8. The method according to claim 1, wherein
a Bluetooth standard, a Digital Enhanced Cordless Telecommunications standard, a HomeRF standard, an IEEE 802.11 standard, an IEEE 802.11b standard, an IEEE 802.11a standard, a HiperLAN standard, a HiperLAN2 standard, a GSM standard or a UMTS standard, is used for data transfer between the access device and the station.

9. The method according to claim 2, wherein the access device sends a request to the data network to allocate a temporary identification address to the station, the request being sent via the service configuration client functions characteristic of stations connected through the connectionless basis in the data network, and
the access device assigns the temporary identification address to the station with the aid of the configuration server functions of the data network.

10. The method according to claim 9, wherein
the access device exchanges data with the station via the communications connection in a transmission frame typical for a point-to-point connection, and
the access device converts the data into a transmission frame corresponding to the connectionless network-internal connection.

11. The method according to claim 10, wherein a Point-to-Point Protocol of a cellular telecommunications network is used to communicate between the station and the access device.

12. The method according to claim 11, wherein
the access device requests an Internet Protocol address from the data network using a Dynamic Host Configuration Protocol client function; and
the access device forwards the Internet Protocol address to the station using the Point-to-Point Protocol.

13. The method according to claim 12, wherein the access device initiates or performs conversion between a Point-to-Point Protocol transmission frame and an Ethernet transmission frame.

14. The method according to claim 13, wherein
a Bluetooth standard, a Digital Enhanced Cordless Telecommunications standard, a HomeRF standard, an IEEE 802.11 standard, an IEEE 802.11b standard, an IEEE 802.11a standard, a HiperLAN standard, a HiperLAN2 standard, a GSM standard or a UMTS standard, is used for data transfer between the access device and the station.

15. The method according to claim 14, wherein
following successful assignment of an Internet Protocol address to the station by a Dynamic Host Configuration Protocol client function of the access device, the Dynamic Host Configuration Protocol client function of the access device is relinquished in favor of a Dynamic Host Configuration Protocol client function of the station, and
further service configuration is performed by the station via Dynamic Host Configuration Protocol client functions of the station and by the Dynamic Host Configuration Protocol server function of the data network.

16. A data network, comprising:
at least one network device that forwards data of a communications connection;
at least one access device having an interface for setting up the communications connection to at least one station, wherein
the access device is implemented such that the communications connection between the access device and at least one of the network devices is established on a connectionless basis via a shared medium;
the access device for the communications connection to the station comprises a logical point-to-point interface conforming to a Point-to-Point Protocol;
the access device requests the data network to allocate a temporary identification address to the station, the request being sent via service configuration client functions characteristic of stations connected on a connectionless basis in the data network; and
the access device assigns the address to the station with the aid of configuration server functions of the data network wherein
following successful assignment of an Internet Protocol address to the station by a Dynamic Host Configuration Protocol client function of the access device, the Dynamic Host Configuration Protocol client function of the access device is relinquished in favor of a Dynamic Host Configuration Protocol client function of the station, and
further service configuration is performed by the station via Dynamic Host Configuration Protocol client functions of the station and by the Dynamic Host Configuration Protocol server function of the data network.

17. The data network according to claim 16, wherein the data network is a local area data network conforming to an Ethernet standard.

18. The data network according to claim 16, wherein the data network comprises basic functions for autonomous operation of the data network.

19. An access device for a data network having a network device that forwards data of a communications connection comprising:
a connection unit to connect the access device to the data network on a connectionless basis via a shared medium;
a logical point-to-point interface conforming to a Point-to-Point Protocol for a communications connection to a station;
a first interface, via which the access device requests the data network to allocate a temporary identification address to the station, wherein the first interface sends the request using service configuration client functions characteristic of stations connected on the connectionless basis in the data network; and a second interface, via which the access device assigns the temporary identification address to the station with the aid of configuration server functions of the data network wherein following successful assignment of an Internet Protocol address to the station by a Dynamic Host Configuration Protocol client function of the access device, the Dynamic Host Configuration Protocol client function of the access device is relinquished in favor of a Dynamic Host Configuration Protocol client function of the station, and further service configuration is performed by the station via Dynamic Host Configuration Protocol client functions of the station and by the Dynamic Host Configuration Protocol server function of the data network.

20. The access device according to claim 19, wherein the access device is implemented on the station side as a radio base station; and the access device is implemented on the network side as a bridge or hub.

* * * * *

UNITED STATES PATENT AND TRADEMARK OFFICE
CERTIFICATE OF CORRECTION

PATENT NO. : 7,286,530 B2 Page 1 of 1
APPLICATION NO. : 10/381809
DATED : October 23, 2007
INVENTOR(S) : Alfred Lupper et al.

It is certified that error appears in the above-identified patent and that said Letters Patent is hereby corrected as shown below:

First Page, Column 1 (Title), Line 1-2, change "DATA TERMINAL DEVICES" to --STATIONS--.

Column 1, Line 1-2 (Title), change "DATA TERMINAL DEVICES" to --STATIONS--.

Signed and Sealed this

Tenth Day of June, 2008

JON W. DUDAS
*Director of the United States Patent and Trademark Office*